United States Patent
Coles et al.

[15] 3,669,188
[45] June 13, 1972

[54] HEAT-GUIDED HYDROXIDE PLUGGING

[72] Inventors: Roy D. Coles; Edwin A. Richardson, both of Houston, Tex.

[73] Assignee: Shell Oil Company, New York, N.Y.

[22] Filed: July 29, 1970

[21] Appl. No.: 59,235

[52] U.S. Cl. ........................... 166/270, 166/261, 166/269, 166/272, 166/288
[51] Int. Cl. ........................... E21b 33/138, E21b 43/24
[58] Field of Search ................. 166/269, 270, 272, 288, 300, 166/258, 261

[56] References Cited

UNITED STATES PATENTS

| | | | |
|---|---|---|---|
| 3,198,249 | 8/1965 | Willman | 166/288 X |
| 2,238,930 | 4/1941 | Chamberlain et al. | 166/300 UX |
| 2,779,415 | 1/1957 | Howard | 166/288 X |
| 2,787,325 | 4/1957 | Holbrook | 166/288 X |
| 2,799,341 | 7/1957 | Maly | 166/288 |
| 2,990,881 | 7/1961 | Nathan et al. | 166/300 X |
| 3,055,423 | 9/1962 | Parker | 166/288 X |
| 3,285,338 | 11/1966 | Boston | 166/270 |
| 3,373,812 | 3/1968 | Smith | 166/288 |

Primary Examiner—Stephen J. Novosad
Attorney—Harold W. Coryell and Harold L. Denkler

[57] ABSTRACT

Selected portions of a near well region of permeable earth formations are plugged by adjusting the temperature so that the selected portions are the hottest portions within the region, permeating the region with heat-responsive plug-forming liquid and, after plugging has occurred in the hotter portions, displacing unreacted plug-forming liquid from the cooler portions.

9 Claims, 4 Drawing Figures

Roy D. Coles
Edwin A. Richardson
INVENTORS

HEAT-GUIDED HYDROXIDE PLUGGING

REFERENCE TO RELATED PATENT APPLICATION

The present patent application is related to patent application Ser. No. 23,550; filed Mar. 30, 1970, by Edwin A. Richardson, which describes a plug-forming liquid comprising a solution of a metal capable of being precipitated as a gelatinous metal hydroxide mixed with a reactant that increases the pH of the solution until the precipitation occurs. The plug-forming liquids, and compositions and techniques for formulating them, which are described in the copending patent application can be utilized in practicing the present invention and are incorporated herein by reference.

BACKGROUND OF THE INVENTION

This invention relates to plugging selected portions of a near well region of permeable earth formations. The invention is particularly useful for reducing the permeability of the most permeable portion of such a region without the necessity of mechanically isolating the portion to be plugged.

Wells are usually drilled through a reservoir interval containing earth formations of different permeabilities. The wells are often lined with casing and cement through which perforations are opened along some or all of the reservoir interval or are equipped with a screen or liner that is surrounded by sand or gravel. It is usually desirable to flow fluid into or out of a reservoir interval so that the rate of flow is about equal in all layers of the interval. If the permeability of one layer is anomalously high, the rate of fluid entry into the reservoir interval is highest within the most permeable layer. Such a layer of amonalously high permeability is commonly referred to as a "thief zone."

Numerous processes have been proposed for reducing the permeability of a thief zone. Treatments such as injection of a cement slurry or a resin-forming fluid are used where the well equipment can be arranged to provide a fluid-confining conduit that communicates only with the thief zone.

Where a cement or resin is injected in order to plug a thief zone in a well that contains a sand or gravel pack or one in which a vertical flow of fluid may occur behind a perforated casing, it is difficult to ensure that the openings which are plugged with cement or resin are confined to those in or leading to the thief zone. In such a situation, any injected fluid tends to enter all layers of the reservoir interval. The rates at which it enters the individual layers are functions of the relative permeabilities of the layers, the effective viscosity of the fluid, and the injection pressure gradient. When a slug of fluid is injected, most of the fluid will enter the zone having the largest kH (product of effective permeability times the thickness of the layer of that permeability). If equal slugs of fluids of different viscosities are injected under the same conditions, the amounts of the two fluids that enter individual portions of the reservoir interval are apt to be significantly different. This tendency provides a severe disadvantage regarding any treatment for decreasing the permeability of a thief zone that depends on an injection of different fluids having different vis-cosities that must contact each other within the earth formations.

Various types of plug-forming liquid solutions or mixtures of reactants can be used to reduce the permeability of a permeable earth formation into which they have penetrated. Such liquids may comprise: a relatively slowly reacting composition such as a resin-forming solution in which most or all of the liquid is converted to a gel and/or a solid resin, e.g., an aromatic hydrocarbon solution of epoxy resin components, of the type described in U.S. Pat. No. 3,308,884; a relatively slowly reacting aqueous solution of sodium silicate containing a polyvalent metal complex which decomposes to form a metal silicate gel, of the type described in U.S. Pat. No. 3,435,899; or the like types of relatively slowly reacting liquid compositions that can be displaced through a well and into the most recpetive portions of a near well region of permeable earth formations before a significant amount of the plugging material has formed.

A uniquely advantageous type of plug-forming liquid is described in the above identified copending patent application. Such a liquid comprises an aqueous solution of a metal that precipitates as a gelatinous metal hydroxide when the pH of the solution is increased by a base-forming reactant. During the pH-increasing reaction, the viscosity and mobility of the fluid remain substantially unchanged while the pH of the aqueous solution is increasing. When a precipitation inducing pH is reached, substantially all of the dissolved metal becomes immediately insoluble in substantially all of the aqueous liquid. This causes a sudden change from a free flowing liquid to an immobile gel.

SUMMARY OF THE INVENTION

The present invention is a process for plugging selected portions of a near well region of permeable earth formations by adjusting the temperature within the region so that the selected portions are relatively hot and temporarily permeating the region with a plug-forming liquid having a heat responsive rate of reaction such that the relatively hot portions are substantially the only ones in which plugging occurs during the residence of the plug-forming liquid within the region.

The present invention is, at least in part, premised on a discovery that it is economically feasible to: (1) adjust the temperature within a near well region of permeable earth formations so that selected portions are significantly hotter than the other portions within that region; (2) permeating the region with a plug-forming liquid having a rate of reaction that is relatively fast in the hotter portions of the region and relatively slow in the cooler portions of the regions; and (3) displacing unreacted plug-forming liquid from the cooler portions of the region after plugging has occurred in the hotter portions.

The present invention provides a process having a capability of avoiding a disadvantage that is inherent in prior processes in which a plug-forming liquid is injected preferentially into the most permeable portions of a near well region of permeable formations of different permeabilities. In such prior processes, the earth formations within the region being treated have substantially equal temperatures and the reaction rate of the plug-forming liquid tends to be equal in all portions of the region. In order to effect the plugging, the plug-forming liquid is kept stationary or kept flowing through the region until the plug formation has occurred. Although most of the injected fluid enters the most permeable portions of the region, some enters the portions of lesser permeability; and, some plugging occurs in both the least permeable and the most permeable portions of the region.

In the same situation, the present process can be used to form plugging material within the most permeable portions while forming substantially none within the portions of lesser permeability. To accomplish this, the most permeable zones are preferentially heated, for example, by injecting a hot fluid. The heated zones are then plug-ged by permeating the region with a plug-forming liquid that reacts rapidly at the temperature of the heated zones and slowly at the tempera-ture of the substantially unheated zones and displacing substantially all of the unreacted plug-forming liquid from the cooler portions within the region after plugging has occurred within the hotter portions.

DESCRIPTION OF THE INVENTION

Figure 1:
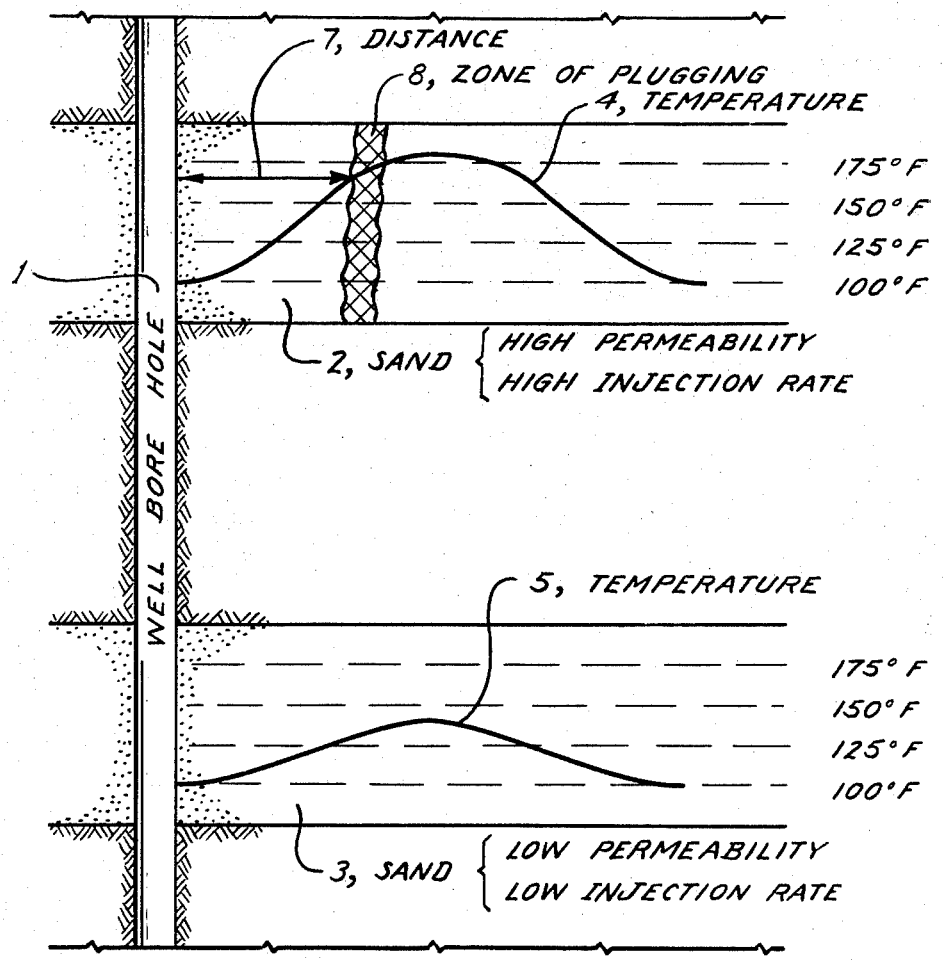
FIG. 1 is a schematic vertical section illustration of a well borehole, the surrounding earth formations, and plots of temperature versus distance within portions of the surrounding earth formations.

In FIG. 1 a well borehole 1 is opened into fluid communication with a relatively highly permeable sand 2, and a significantly less permeable sand 3. As indicated by the temperature curves 4 and 5, which have distance from the borehole for an abscissa and temperature for an ordinate, the sands 2 and 3 have been heated so that their temperatures increase then decrease with distance from the well. Such a heating can be accomplished by injecting a slug of hot fluid, e.g., an aqueous liquid at about 180° F, keeping it static within the earth formations for a relatively short time (to allow heat to penetrate into the rocks) and then injecting a slug of relatively cool fluid (in order to cool the borehole and the region immediately around the borehole). In the permeable sand 2, at the distance 7 from the well, the temperature is 175° F, while in the less permeable sand 3 the temperature is never as high at 150° F because sand 3 received much less of the heated fluid.

Sand 2 becomes selectively plugged, in zone 8, at the distance 7 from the well, when a plug-forming liquid which reacts quickly at a temperature of 175° F, but reacts only slowly at temperatures below 150° F is injected and displaced through the near well region of permeable earth formations. The displacement removes the unreacted plug-forming liquid from the cooler portions (e.g., sand 3) of that region after a plug has been formed in the hotter portions.

Conventional equipment and techniques can be used in order to inject and/or displace temperature adjusting fluids, plug-forming liquids, and/or inert displacing fluids (such as unreactive aqueous or hydrocarbon fluids).

Where the region of earth formations being treated is relatively hot, for example, in a deep subterranean reservoir, an adjustment of the temperatures to be hottest within the most permeable and coolest within the least permeable portions of the region can be accomplished by simply injecting a slug of relatively cool liquid and subsequently back-flowing fluid into the well borehole (preferably not backflowing much more than the amount of fluid that was injected). The temperature and volume of injected cool liquid should be adjusted to cause the temperature to be reduced by a significant amount in both the less permeable and the more permeable portions of the near well region. The backflowing causes a preferential production of fluid from the most permeable portions of the region. Each increment of produced fluid is replaced by an increment of relatively hot natural formation fluid and the most permeable portions become the hottest portions of the near well region.

In general, a "near well" region of earth formations within which the present type of temperature adjusting and formation plugging is effected, comprises a region that is immediately adjacent to the borehole of a well and has a diameter of not much more than a few feet (generally less than about 20 feet). The effect of plugging diminishes by a factor that approximates the square of the distance from the borehole of the well. When a slug of fluid such as a slug of plug-forming liquid is injected to permeate such a region, its volume should correspond to about one to ten pore volumes of the permeable earth formations in that region. Where selected portions of such a region are plugged by displacing a plug-forming liquid through the region, the rate of fluid injection, the rate of reactivity of the plug-forming liquid, the temperature differential between the hottest and coolest portions of the region, and the duration of the treatment should be correlated so that the resident time of each increment of plug-forming liquid within the region is such that plug formation occurs within the hottest portions, but not within the coolest portions.

As indicated in FIG. 1 by the displacement of the maxima of the temperature curves 4 and 5, away from the well, the injection of a slug of hot fluid followed by a slug of relatively cool fluid displaces a hot zone radially away from a well. As indicated by the location of the zone of plugging 8, such a radial displacement of a hot zone controls the disposition of a plug within the earth formations around a well. In a given situation, the hottest portions within a near well region can be displaced further away from the well by injecting additional slugs of hot and cold fluid. In the present process, the adjustment of the temperature of a near well region can be effected by means of: underground combustion; the injection of hot aqueous and/or hydrocarbon liquids such as steam or hot gas; the injection of chemicals which react exothermically with the oil and/or rocks within the region; etc. The fluid by which the temperature adjustment is effected can be injected through the well being treated or can be injected through one or more adjacent wells that communicate with the same earth formations.

Where the plug-forming liquid is one which undergoes a pH-triggered precipitation of gelatinous metal hydroxide, the plugged zone can be formed immediately adjacent to the well. For example, the temperature within the region being treated can be adjusted by injecting hot liquid so that heat is imparted to the conduits within the borehole, the face of the exposed earth formations and the rocks in and around the most permeable flow channels within the earth formation. The injected hot fluid can be followed substantially immediately by a plug-forming liquid that is relatively rapidly reactive at the temperature of the injected fluid and the latter can be kept static within the region being treated until plugging has occured. This is likely to cause at least some plugging within both the most permeable portions of the earth formation and the borehole of the well. One advantageous feature of the gelatmous metal hydroxide plug is that within relatively large openings, such as those in the conduits, etc., within the borehole of a well, the gel structure can readily be broken and the gel can be entrained and removed by simply circulating a fluid within the borehole.

Figure 2:
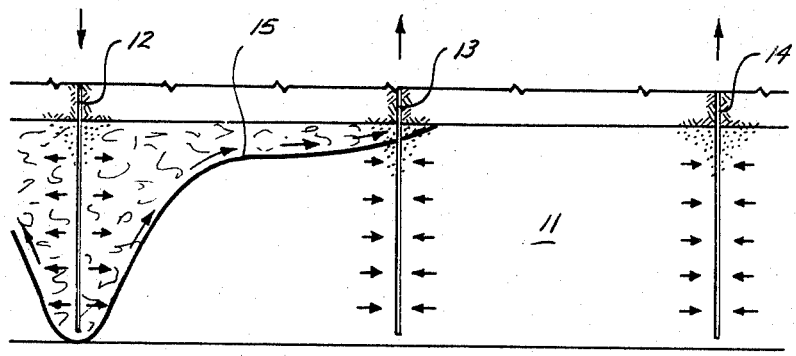
FIGS. 2 through 4 are schematic vertical section illustrations of three stages of a steam drive oil production process.
Figure 3:
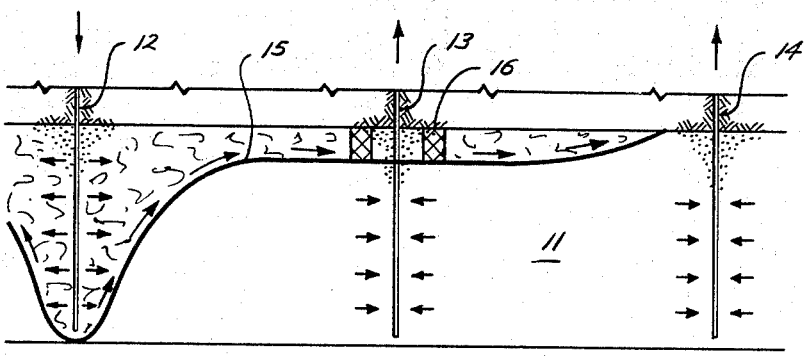
Figure 4:
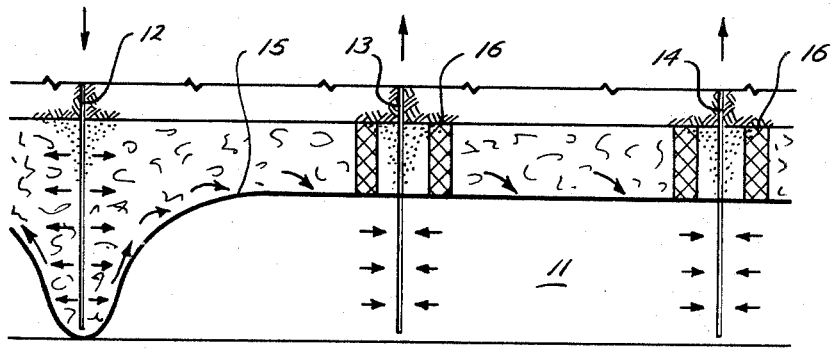

In the oil recovery operations illustrated in FIGS. 2 through 4 oil is being recovered from a relatively thick oil reservoir 11 by means of a steam drive. Steam is injected through well 12 while fluid is produced from wells 13 and 14. As indicated by the arrows, all of the wells in such a production pattern may be opened (e.g., by casing and perforating their boreholes) throughout the vertical extent of the reservoir.

As shown in FIG. 2, in an early stage, the front 15 of the injected steam may rise and advance most rapidly along the top of the reservoir, i.e., may undergo a gravity layover. At this stage, the fluid that inflows into well 13 contains steam as well as reservoir oil and water that is displaced by steam.

In accordance with the present invention, the adverse effect of such a steam breakthrough can be counteracted, as indicated in FIG. 3, by injecting a slug of plug-forming liquid into well 13. Such an injection can advantageously be preceded by injecting a slug of relatively cool fluid to transfer out at least some of any heat which was carried into the borehole. The injected plug-forming liquid should be one which reacts rapidly at the steam temperature while reacting slowly at the normal reservoir temperature. After injecting the plug-forming liquid, the production of fluid from the well can be resumed as soon as sufficient time has elasped for the formation of a plug in the steam-heated zone near the well. Such a plugging treatment provides a barrier 16 zone of plugging that impedes the inflow of steam into the well 13 and forces the steam to move on toward an adjacent well, such as well 14.

As indicated in FIG. 4, such selective plugging treatments can be repeated in the wells nearest the location at which the steam is injected so that the zones of plugging 16 are extended downward to accom-modate the downward growth of the steam zone. In addition, such selective plugging treatments can be applied to additional producing wells. As indicated by arrows, such additional treatments convert the general flow of the steam driven oil-displacement from one in which the flow is mainly horizontal to one in which it is mainly downward. As known to those skilled in the art, the latter type of an oil-displacing steam drive is gravity stable and is often advantageous in providing a relatively complete displacement of the reservoir oil.

Where a plurality of patterns of injection and production wells are used to produce oil by means of a thermal drive from an areally extensive reservoir, the hot drive fluid is apt to bypass or finger through the reservoir fluids and enter one or more of the production wells that are common to adjacent patterns. When the drive fluid is steam, conventional practice has heretofore involved the plugging-back a relatively extensive section of each production well that is reached by the steam. Such plug-ging-back is usually accomplished by installing a section of blank (not perforated) casing and/or cement, and/or gravel permeated with cement, along the portions to which the steam is inflowing. In practice, such plugging-back operations tend to block-off and prevent the production of significant amounts of oil. However, such operations have been required, because fluid could not be pumped from the well until the inflow of steam had been terminated.

As indicated in FIGS. 3 and 4, each of the present heat guided plugging operations position a plug in, and only in, the zones or layers through which the steam is actually inflowing into the well. Such an incremental treatment, of one steam finger at a time, provides a means for causing substantially all of the reservoir oil to be displaced into the production wells. The present process is uniquely advantageous where, for example, a steam finger has extended into only one side of a well. The present process is adapted to form a plug that is displaced only in the portion through which the steam was entering.

Similar selective plugging uses of the present invention can be made with respect to other types of thermal drives such as those employing hot water, underground combustion, mixtures of steam and hot aqueous liquid, composite steam and/or underground combustion and/or hot liquid drives, etc. For example, in a hot water water drive in a reservoir formation which contains an underlying layer of water, the selective plugging can be initiated near the bottom of the reservoir, where portions are selectively heated by fingers of hot water that underrun the less permeable oil zone and cause an early breakthrough into the production wells. Such a hot water drive can ultimately be converted to a gravity stable vertical upward displacement of the reservoir oil.

In general, the plug-forming liquid used in the present invention should be a pumpable liquid composition containing components which (1) interact to form a material capable of plugging the pores of a permeable earth formation and (2) interact at a rate that is relatively fast at the temperature of the hottest portion of a near well region and is relatively slow at the temperature of the coolest portions of that region. As indicated above, such liquids can comprise compositions previously suggested for plugging subterranean earth formations, as long as the concentrations and types of the reactants and/or reaction-accelerators are adjusted to provide a relatively fast rate of interaction at the hotter temperatures and a relatively slow rate at the lower temperatures within the near well regions of earth formations being treated.

A preferred type of plug-forming liquid for use in the present invention comprises a homogeneous solution consisting essentially of a water solution of polyvalent metal salt and pH-increasing reactive material, where the solution has a relatively low pH, contains a metal that forms a gelatinous or hydrous or hydrated metal oxide or hydroxide at a higher pH, and a reactive material that raises the pH of the solution and causes the precipitation. Such a solution can contain numerous other ingredients as long as they do not interfere with the functions of the above components. For example, where a thief zone is vulgular or contains relatively large pores, the plug-forming solution can advantageously contain a suspension of finely divided solid materials such as crushed sand grains, carbonates, etc., to aid in the reduction of the permeability. Where desirable, for example in treating a water-sensitive clay, clay-stabilizing agents such as neutral salts, amines, amine salts, etc., can be added. Where desired, for example, in view of the particular distribution of the thicknesses and permeabilities of the individual layers within the reservoir interval, the plug-forming solution can contain thickening agents such as carboxymethyl cellulose, polyacrylamides, etc.

Polyvalent metal salts suitable for use in such plug-forming fluids comprise substantially any such salt that is soluble in an aqueous solution of relatively low pH and is precipitated in the form of a hydrated metal oxide from an aqueous solution of a moderately higher pH. Such salts are preferable soluble at a pH of from about 2 to 7 and precipitated at a pH of from about 7 to 10. The preferred salts are salts of metals which form gelatinous metal hydroxides or hydrated metal oxides of very low solubility. Such metals are typified by chromium, aluminum, iron, copper, bismuth, etc. The suitable salts of such metals are those that have a relatively high water solubility in solutions having a pH of from about 2 to 7, such as the chlorides, nitrates, acetates, etc.

Reactive pH-adjusting materials which are suitable for use in such plug-forming fluids comprise substantially any water-soluble compounds or mixtures which react within a water solution to produce water-soluble alkaline reaction products that increase the pH of the solution in a manner such that the polyvalent metal salt remains dissolved until the pH of the solution has reached the value at which a gelatinous hydroxide of the metal is precipitated. Suitable reactant materials include water-soluble amides of carbamic acid, such as ammonium carbamate, carbonic acid halides, urea, salts of cyanic acid such as alkali metal cyanates, cyanamide, etc. Urea and potassium cyanate are particularly suitable reactants which increase the pH of an aqueous solution by producing ammonium hydroxide at rates which are suitable for use at temperatures commonly encountered in subterranean earth formations.

In general, the rate of reaction of the plug-forming liquid should be adjusted in coordination with the extent of the temperature differential (between the selected relatively hot zones and the non-selected relatively cool zones within the near well region being treated) to form a plug in the hotter zones while allowing time for the displacement of the unreactive plug-forming liquid out of the region being treated before a plug is formed in the cooler zones. In one preferred type of such liquids, in which a reaction such as the hydrolysis of urea is used to increase the pH of an aqueous solution to one which will trigger a rapid precipitation of gelatinous metal hydroxide, the rate of the pH-increasing reaction is approximately doubled with each 8° F increase in temperature. Where, for example, a selected hotter zone is 40° hotter than a non-selected cooler zone and a urea-hydrolysis requires about 20 minutes to trigger the plugging within the hot zone, over 10 hours (640 minutes) would be required for the triggering of the plugging in the cooler zone.

What is claimed is:

1. In treating a region of permeable earth formation near a well by injecting a plug-forming liquid in order to reduce the permeability of selected portions of the region, the improvement which comprises:
   adjusting the temperature within said region to cause said selected portions to be the hotter portions;
   injecting into said region a plug-forming liquid that reacts to deposit a plugging material faster in said hotter portions than in the cooler portions with said plug-forming liquid comprising an aqueous solution of metal that is adapted to precipitate as a gelatinous metal hydroxide mixed with a reactant which increases the pH of the aqueous solution to cause said precipitation; and
   displacing unreacted plug-forming liquid from the cooler portions of said region after plugging has occurred in the hotter portions.

2. The process of claim 1 in which the temperature within said region is adjusted by injecting at least one slug of relatively hot fluid from substantially the same location from which said plug-forming liquid is injected.

3. The process of claim 1 in which the temperature within said region is adjusted by injecting hot fluid from a location remote from the location from which said plug-forming liquid is injected.

4. The process of claim 1 in which the temperature within said region is adjusted by injecting a relatively cool fluid.

5. The process of claim 1 in which said plug-forming liquid is injected in the form of a slug which is kept static within said region until plugging has occurred within said hotter portions.

6. The process of claim 1 in which a stream of said plug-forming liquid is displaced through said region at a rate providing a resident time for each increment that is sufficient to cause plugging within said hotter portions but insufficient to cause plugging within said cooler portions.

7. In a process of producing oil from a subterranean reservoir by operating at least one pair of injection and production wells to flow hot oil-displacing fluid within said reservoir while producing fluid from the reservoir, an improved process for continuing said oil production after said hot oil-displacing fluid begins to flow into at least one production well, comprising:

interrupting fluid production from a production well into which said inflow of hot fluid has occurred and injecting into the near well region around said well a plug-forming liquid that reacts to deposit a plugging material faster in the hotter portions than in the cooler portions of said region;

displacing unreacting plug-forming liquid from the cooler portions of said region after plugging has occurred in the hotter portions; and returning said production well to the production of fluid.

8. The process of claim 7 in which said plug-forming liquid comprises an aqueous solution of a metal that is adapted to precipitate as a gelatinous metal hydroxide mixed with a reactant that increases the pH of the aqueous solution to cause said precipitation.

9. The process of claim 8 in which said injection of plug-forming liquid is preceded by injection of relatively cool fluid to transport heat from within the borehole to within the reservoir.

* * * * *